US009049692B2

(12) United States Patent
Nguyen et al.

(10) Patent No.: US 9,049,692 B2
(45) Date of Patent: Jun. 2, 2015

(54) HYBRID ACCESS PROTOCOL FOR NETWORK NODES

(75) Inventors: Viet-Hung Nguyen, Saint-Mande (FR); Bastien Mainaud, Ris-Orangis (FR)

(73) Assignee: Itron, Inc., Liberty Lake, WA (US)

( * ) Notice: Subject to any disclaimer, the term of this patent is extended or adjusted under 35 U.S.C. 154(b) by 221 days.

(21) Appl. No.: 13/452,723

(22) Filed: Apr. 20, 2012

(65) Prior Publication Data
US 2013/0272293 A1 Oct. 17, 2013

Related U.S. Application Data

(63) Continuation of application No. PCT/US2012/034273, filed on Apr. 19, 2012.

(30) Foreign Application Priority Data

Apr. 13, 2012 (EP) .................................... 12164151

(51) Int. Cl.
*H04W 74/08* (2009.01)
*H04W 74/02* (2009.01)
*H04W 84/22* (2009.01)
*H04W 72/12* (2009.01)

(52) U.S. Cl.
CPC .............. *H04W 74/02* (2013.01); *H04W 84/22* (2013.01); *H04W 72/1289* (2013.01)

(58) Field of Classification Search
CPC ..................................................... H04W 74/02
USPC .......... 379/336, 338, 341, 503; 370/336, 338, 370/341, 503
See application file for complete search history.

(56) References Cited

U.S. PATENT DOCUMENTS

2002/0167960 A1  11/2002  Garcia-Luna-Aceves
2003/0198206 A1  10/2003  Cain et al.
(Continued)

FOREIGN PATENT DOCUMENTS

EP      1233574 A2    8/2002
EP      2282599 A1    2/2011
WO      WO03085891 A1  10/2003

OTHER PUBLICATIONS

Rhee Z-MAC: A Hybrid MAC for Wireless Sensor Networks IEEE/ACM Transactions on Networking, vol. 16, No. 3, Jun. 2008.*

(Continued)

*Primary Examiner* — Donald Mills
*Assistant Examiner* — Henry Baron
(74) *Attorney, Agent, or Firm* — Lee & Hayes, PLLC

(57) ABSTRACT

A hybrid access protocol (HAP) controls access of nodes of a network to a communication medium, such as a radio frequency communication channel. In one example, a one-hop neighbor of a root node receives priority information from the root node, which includes a list of communication time slots, and an indication of one or more of the communication time slots during which the one-hop neighbor has communication priority relative to other one-hop neighbors of the root node. If the one-hop neighbor has information to transmit to the root node, it waits a predetermined period of time before transmitting the information to the root node. While waiting, the one-hop neighbor listens for transmissions by other nodes. In response to expiration of the predetermined period of time without overhearing transmissions by other nodes, the one-hop neighbor transmits its data to the root node.

20 Claims, 7 Drawing Sheets

(56) References Cited

U.S. PATENT DOCUMENTS

| | | |
|---|---|---|
| 2008/0089390 A1 | 4/2008 | Picard |
| 2008/0101308 A1 | 5/2008 | Gaur |
| 2009/0003306 A1 | 1/2009 | Plutov et al. |
| 2009/0022136 A1 | 1/2009 | Joshi et al. |
| 2009/0116511 A1 | 5/2009 | Anderson et al. |
| 2011/0268139 A1* | 11/2011 | Caracas et al. ............... 370/503 |

OTHER PUBLICATIONS

Zhang SCL: A Cross-Layer Protocol for Wireless Sensor Networks, Mar. 11, 2012.*

The Extended EP Search Report mailed Aug. 8, 2012 for European patent application No. 12164151.8, 7 pages.

The PCT Search Report mailed Feb. 25, 2013 for PCT application No. PCT/US12/34273, 11 pages.

Freaklabs—Open Source Wireless, IEEE 802.15.4 in the context of Zigbee—Part 2, Dec. 14, 2008, 8 pages.

Hussain et al., "Dynamic Contention Window for Quality of Service in IEEE 802.11 Networks," National Conference on Emerging Technologies, 2004, pp. 12-16.

Lottich, "Z-MAC: a Hybrid MAC for Wireless Sensor Networks," in the Proceedings of the 3rd ACM Conference on Embedded Network Sensor Systems (Sensys2006), Nov. 2005, 24 pages.

Revolution Wi-Fi, The Wireless Professional's Connection for Independent Analysis, retrieved on Feb. 10, 2012 at <<http://revolutionwifi.blogspot.com/2010/08/wireless-qos-part-5-contention-window.html>>, 12 pages.

Wireless Medium Access Control, IEEE 802.15.4, Speaker Chun-Yi Chen, Sep. 7, 2007, 40 pages.

Nafaa et al., "SCW: Sliding Contention Window for Efficient Service Differentiation in IEEE 802.11 Networks," 2005 IEEE, 6 pages.

Zhang, "SCL: A Cross-Layer Protocol for Wireless Sensor Networks," A thesis submitted to the Graduate Faculty of Auburn University in partial fulfillment of the requirements for the Degree of Master of Science, Auburn, Alabama, May 7, 2012, copyright 2011, 56 pages.

* cited by examiner

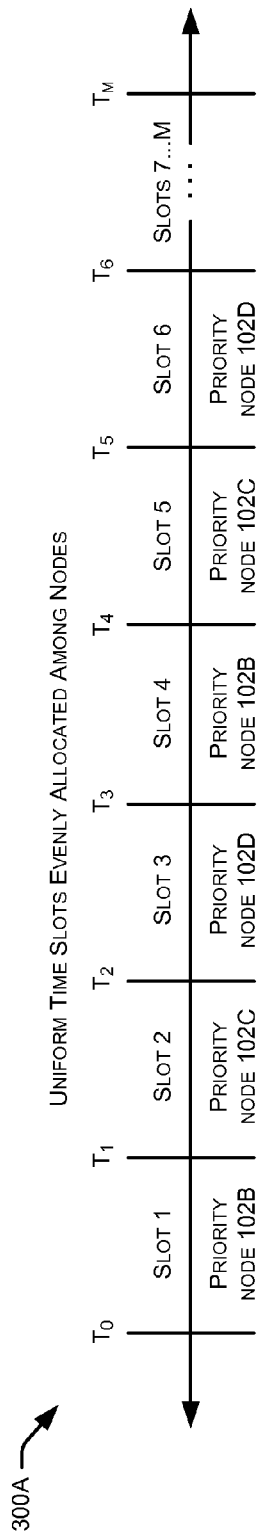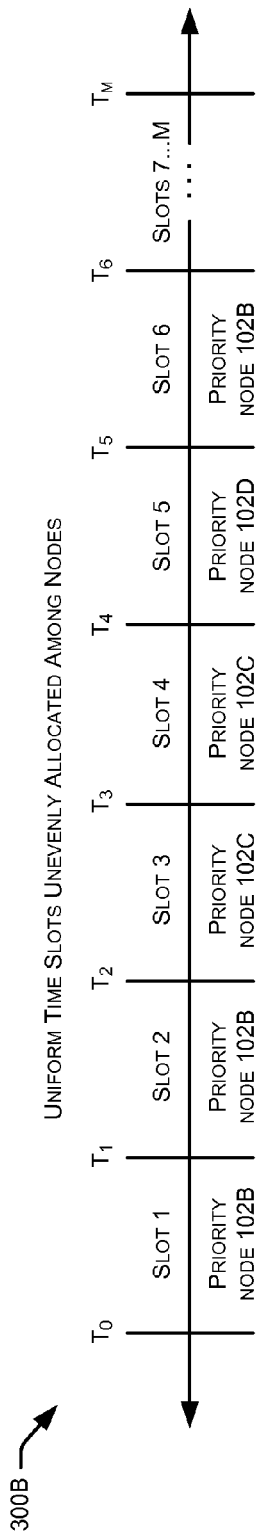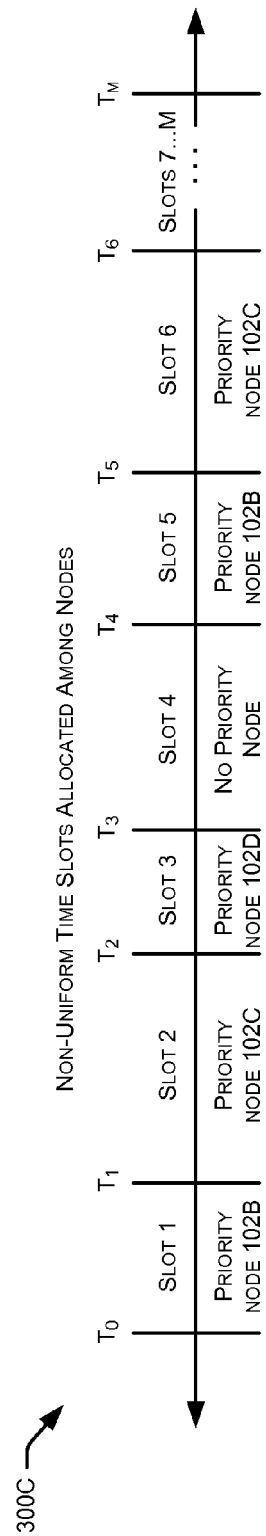

HYBRID ACCESS PROTOCOL FOR NETWORK NODES

RELATED APPLICATION

This application is a continuation of PCT International Application No. PCT/US Ser. No. 12/34273, filed Apr. 19, 2012, which claims foreign priority to European Application No. 12164151.8, filed on Apr. 13, 2012, both of which are incorporated herein by reference.

BACKGROUND

Communication networks, such as mesh networks, are used to connect a variety of different devices. For example, mesh networks have been employed in the utility industry to connect utility meters, cellular relays, transformers, and/or other nodes. The nodes in the mesh network are typically able to receive data from neighboring nodes and to relay or propagate messages to other neighbor nodes.

A mesh network may include a plurality of nodes, many of which may include software producing data for transmission. Many of the nodes may also have associated devices, including sensors, meters, etc., which may gather data. Collectively, the nodes may generate a considerable amount of data to be sent upstream to a root node for transmission to a central office.

Existing networks and systems create bottle necks at nodes near the root node, resulting in transmission delays and quality of service issues. Several approaches that have been used to handle communications include time division multiple access (TDMA) and carrier sense multiple access with collision avoidance (CSMA/CA) protocols. However, there are drawbacks associated with each of these existing protocols. For example, while TDMA protocol is known for its capability of providing guaranteed throughput and bounded delay under heavy network load, TDMA is inefficient under low and medium network loads. CSMA/CA protocol, on the other hand, is generally more efficient under low and medium network loads, but does not ensure that each node will have an opportunity to transmit data during periods of heavy network load.

Thus, existing protocols do not provide an effective way of handling transmissions within a wireless mesh network subject to varying network loads.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIGS. 3A-3C are schematic diagrams illustrating three examples of priority information identifying one or more time slots, and specifying which of the one-hop neighbors of the root node has communication priority relative to other one-hop neighbors of the root node during each time slot.

DETAILED DESCRIPTION

Overview

Figure 1:
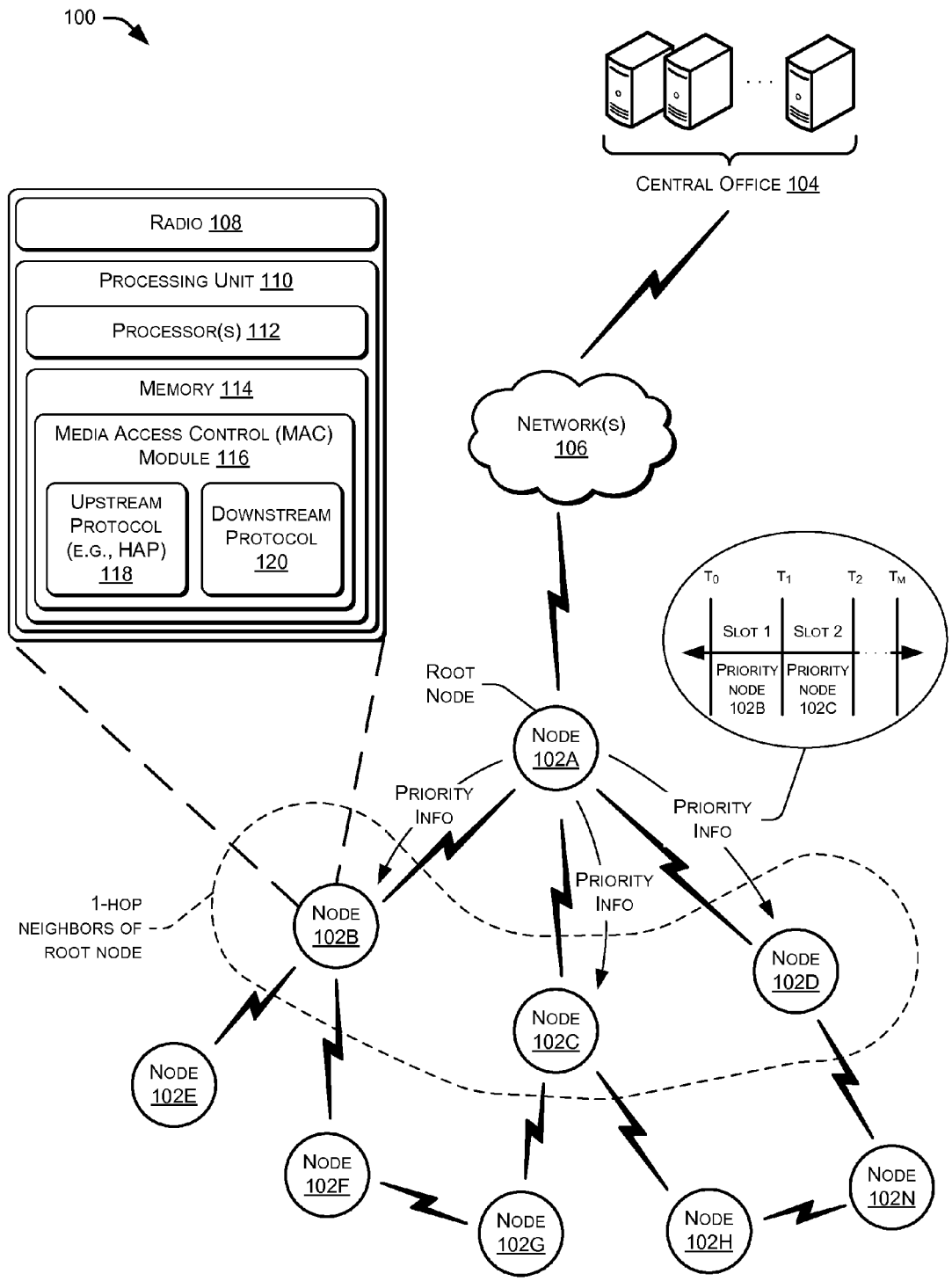
FIG. 1 is a schematic diagram of an example architecture of a multi-channel wireless mesh network in which one-hop neighbors of a root node can effectively handle transmissions under varying network load conditions.

As discussed above, existing metrics do not provide an effective way of handling transmissions within a wireless mesh network that experiences varying network loads. For example, time division multiple access (TDMA) protocol guarantees that each node always has an opportunity to communicate by reserving dedicated time slots for each node, during which other nodes are not allowed to communicate over the communication channel. The TDMA protocol ensures that each node has an opportunity to communicate during periods of high network load. However, under low and medium network loads, the TDMA protocol is inefficient since certain nodes may not have a need to communicate during their dedicated time slot and the time slot may therefore be wasted. The CSMA/CA protocol, on the other hand, is generally more efficient under low and medium network loads, but does not ensure that each node will have an opportunity to transmit data during periods of heavy network load. Thus, existing protocols are not well suited to transmitting data in mesh networks that experience varying network loads.

This application describes a hybrid access protocol (HAP) that controls access of nodes of a network to a communication medium, such as a radio frequency communication channel. The HAP guarantees that each node will have an opportunity to communicate its data, while still allowing other nodes to communicate in the event that a priority node does not have any data to transmit. Typically, the HAP may be implemented at the media access control (MAC) sub-layer of nodes communicating directly with the root node (i.e., one-hop neighbors of the root node). However, in some cases, the HAP may be employed by other nodes of the network.

In one example, the HAP divides time on a communication channel into multiple time slots. Each time slot is assigned a unique number by the root node. When a node gets associated with the root node, the root node will allocate one or more of the time slots to the new node. The new node will become the "owner" of its allocated time slots and will have communication priority during its allocated time slots. Compared to other nodes, a time slot owner will be authorized to use shorter inter-frame spacing (IFS) and/or shorter contention windows, thus increasing its chance of accessing the communication channel. If a time slot is not used by its owner, other nodes can use it for transmission, thus avoiding the problem of bandwidth waste in classic TDMA protocols, in which a TDMA slot is strictly reserved for a unique node even if the node does not presently have anything to transmit. In this way, the HAP allows nodes to efficiently handle communications during a wide range of network loads.

The HAP is described in the context of a multi-channel utility mesh network including a plurality of nodes. Nodes of the utility mesh network may include, for example, smart utility meters (e.g., electric, gas, and/or water meters), sensors (e.g., temperature sensors, weather stations, frequency sensors, etc.), control devices, transformers, routers, servers, relays (e.g., cellular relays), switches, valves, and other network devices. While the HAP is described in the context of a utility mesh network, the techniques may additionally or alternatively be applicable to other networks and/or other applications. As such, in other implementations, nodes may include any device coupled to a communication network and capable of sending and/or receiving data.

Multiple and varied implementations and embodiments are described below, beginning with a description of an "Example Architecture" usable to implement a HAP scheme. Next, a section entitled "Example Node" describes details of an example node usable to implement the HAP described herein. Next, the application describes examples of "Priority Information" that may be sent by a root node and/or received by a one-hop neighbor of a root node, and "Example Transmission Scenarios" that may be implemented using a HAP. Next the application describes "Example Methods of Managing Transmission Using Hybrid Access Protocol." Finally, the application concludes with a brief "Conclusion." This Overview and the following sections, including the section headings, are merely illustrative implementations and embodiments and should not be construed to limit the scope of the claims.

Example Architecture

FIG. 1 is a schematic diagram of an example architecture 100 of a multi-channel, wireless mesh network in which data can be transmitted according to a hybrid access protocol (HAP). The architecture 100 includes a plurality of nodes 102A, 102B, 102C, ... 102N (collectively referred to as nodes 102) communicatively coupled to each other via direct communication paths or "links." In this example, N represents a number of nodes in an autonomous routing area (ARA), such as a wide area network (WAN), metropolitan area network (MAN), local area network (LAN), neighborhood area network (NAN), personal area network (PAN), or the like. The ARA may form part of a larger advanced metering infrastructure (AMI) network.

The term "link" refers to a direct communication path between two nodes (without passing through or being propagated by another node). As used herein, the term "link" includes both wireless (e.g., radio frequency) and wired (e.g., power line communication, Ethernet, etc.) communication paths. However, some concepts described herein may be specific to wireless communications. In the context of wireless radio frequency (RF) communication paths, each link may represent a plurality of channels over which a node is able to transmit or receive data. Each of the plurality of channels may be defined by a frequency range which is the same or different for each of the plurality of channels. The plurality of channels may comprise a control channel and multiple data channels. In some instances, the control channel is utilized for communicating one or more messages between nodes to specify one of the data channels to be utilized to transfer data. Generally, transmissions on the control channel are shorter relative to transmissions on the data channels.

Each of the nodes 102 may be implemented as any of a variety of conventional computing devices such as, for example, smart utility meters (e.g., electric, gas, and/or water meters), sensors (e.g., temperature sensors, weather stations, frequency sensors, etc.), control devices, transformers, routers, servers, relays (e.g., cellular relays), switches, valves, combinations of the foregoing, or any device couplable to a communication network and capable of sending and/or receiving data.

In this example, the nodes 102 are also configured to communicate with a central office 104 via an edge device or "root node" (e.g., cellular relay, cellular router, edge router, etc.), which serves as a connection point of the ARA to a backhaul network(s) 106, such as the Internet. In the example illustrated example, the node 102A serves as a root node of the ARA to relay communications from the other nodes 102B-102N of the ARA to and from the central office 104 via the network(s) 106.

In the illustrated example, nodes 102B, 102C, and 102D share a direct communication link with the root node 102A and are therefore referred to as one-hop neighbors of the root node 102A. The one-hop neighbors of the root node 102A employ the HAP to ensure that each one-hop neighbor has an opportunity during its respective priority time slot to communicate with the root node 102A on the control channel, even during periods of heavy network load. During periods of medium or low network load, the HAP allows other one-hop neighbors of the root node to communicate with the root node on the control channel if the priority slot owner does not presently have data to transmit. While the HAP is described as being usable to control access to the control channel, in some instances the HAP may be applicable to control access to channels other than the control channel (e.g., data channels).

The node 102B is representative of each of the nodes 102 and includes a radio 108 and a processing unit 110. The radio 108 comprises a radio frequency (RF) transceiver configured to transmit and/or receive RF signals via one or more of a plurality of channels/frequencies. In some implementations, each of the nodes 102 includes a single radio 108 configured to send and receive data on multiple different channels, such as the control channel and multiple data channels of each communication link. The radio 108 may also be configured to implement a plurality of different modulation techniques, data rates, protocols, signal strengths, and/or power levels. Additionally or alternatively, each of the nodes may be configured for wired communication. By way of example and not limitation, wired communications may include power line communications (PLC) or other wired communication network technologies, such as Ethernet. The architecture 100 may represent a heterogeneous network of nodes, in that the nodes 102 may include different types of nodes (e.g., smart meters, cellular relays, sensors, etc.), different generations or models of nodes, and/or nodes that otherwise are capable transmitting on different channels and using different modulation techniques, data rates, protocols, signal strengths, and/or power levels.

The processing unit 110 may include one or more processor(s) 112 communicatively coupled to memory 114. The memory 114 may be configured to store one or more software and/or firmware modules, which are executable on the processor(s) 112 to implement various functions. While the modules are described herein as being software and/or firmware executable on a processor, in other embodiments, any or all of the modules may be implemented in whole or in part by hardware (e.g., as an ASIC, a specialized processing unit, etc.) to execute the described functions.

In the embodiment of FIG. 1, the memory 114 includes a Media Access Control (MAC) module 116 to handle transmissions between and among the one-hop neighbors of the nodes 102 of the ARA. The MAC module 116 includes logic to implement an upstream protocol 118 and a downstream protocol 120. The upstream protocol 118 defines how the nodes 102 should transmit upstream communications destined for the root node or other parent of the node 102. The downstream protocol 120 defines how the nodes 102 should transmit downstream communications destined for a child of the node 102. By way of example and not limitation, upstream protocols that may be used by nodes 102 of the network include the HAP, TDMA protocol, CSMA/CA protocol, or other conventional MAC protocols. Different nodes may employ the same or different upstream and/or downstream MAC protocols. For example, one-hop neighbors of the root node 102A may employ a different upstream MAC protocol than other nodes in the network. In one specific example, one-hop neighbors of the root node 102A may employ the HAP upstream protocol, while nodes other than the one-hop neighbors of the root node (e.g., downstream nodes 102E, 102F, 102G, 102H, ... 102N) may employ CSMA/CA as the upstream protocol. In such an example, all of the nodes in the network may use a same downstream protocol (e.g., CSMA/CA protocol). Additional details of how the MAC module 116 may handle communications is provided below in the discussion of FIGS. 3A-3C and FIGS. 4A and 4B.

The memory 114 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

The network(s) 106, meanwhile, represents a backhaul network, which may itself comprise a wireless or a wired network, or a combination thereof. The network(s) 106 may be a collection of individual networks interconnected with each other and functioning as a single large network (e.g., the Internet or an intranet). Further, the individual networks may be wireless or wired networks, or a combination thereof.

The central office 104 may be implemented by one or more computing devices, such as servers, personal computers, laptop computers, etc. The one or more computing devices may be equipped with one or more processor(s) communicatively coupled to memory. In some examples, the central office 104 includes a centralized meter data management system which performs processing, analysis, storage, and/or management of data received from one or more of the nodes 102. For instance, the central office 104 may process, analyze, store, and/or manage data obtained from a smart utility meter, sensor, control device, router, regulator, server, relay, switch, valve, and/or other nodes. Although the example of FIG. 1 illustrates the central office 104 in a single location, in some examples the central office may be distributed amongst multiple locations and/or may be eliminated entirely (e.g., in the case of a highly decentralized distributed computing platform).

Example Node

Figure 2:
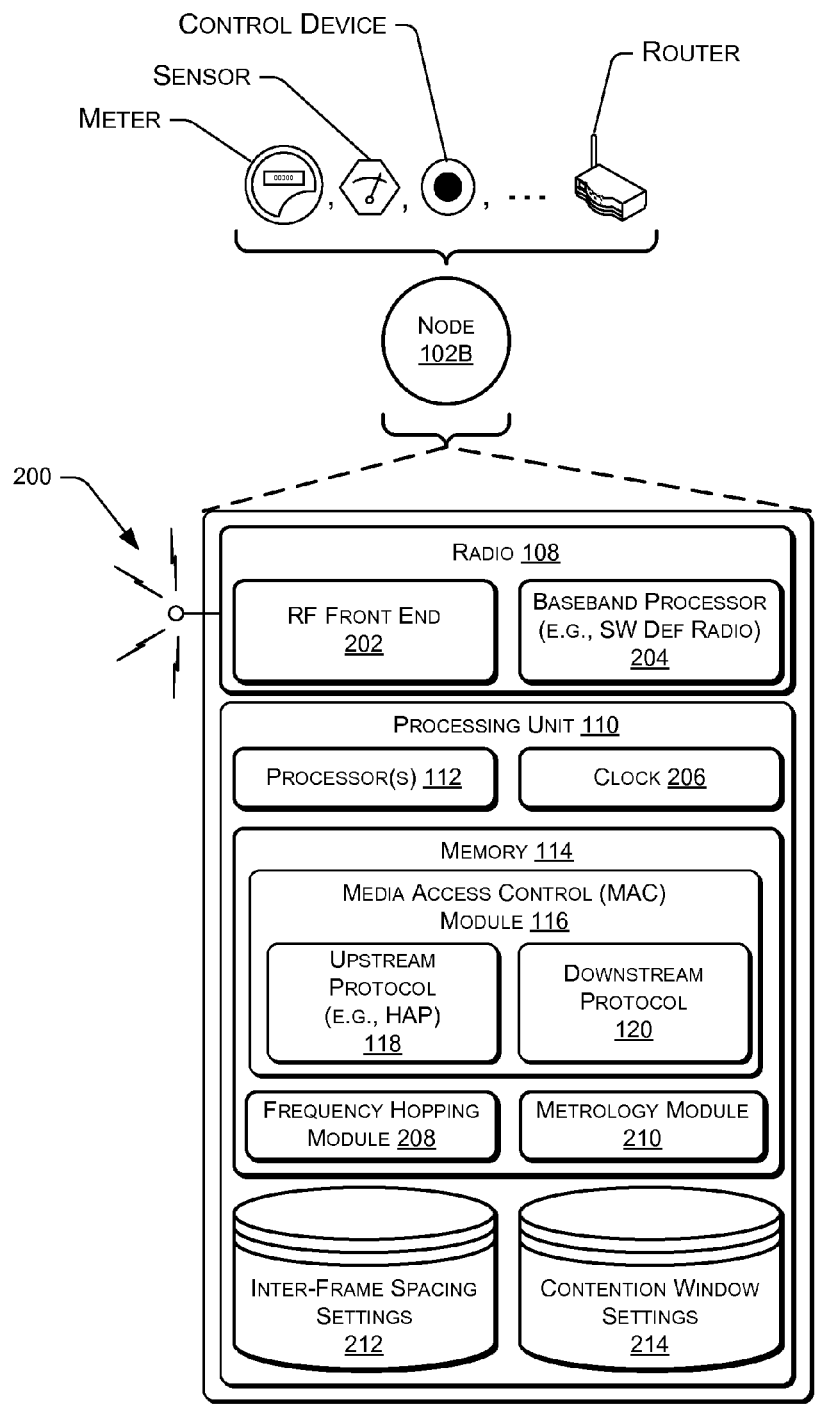
FIG. 2 is a schematic diagram showing additional details of an example node of the architecture of FIG. 1.

FIG. 2 is a schematic diagram showing additional details of example node 102B of FIG. 1. In this example, the radio 108 includes an antenna 200 coupled to an RF front end 202 and a baseband processor 204. The RF front end 202 may provide transmitting and/or receiving functions. The RF front end 202 may include high-frequency analog and/or hardware components that provide functionality, such as tuning and/or attenuating signals provided by the antenna and obtained from one or more of the nodes 102. The RF front end 202 may provide a signal to the baseband processor 204.

In one example, all or part of the baseband processor 204 may be configured as a software (SW) defined radio. In one example, the baseband processor 204 provides frequency and/or channel selection functionality to the radio 108. For example, the SW defined radio may include mixers, filters, amplifiers, modulators and/or demodulators, detectors, etc., implemented in software executed by a processor or application specific integrated circuit (ASIC) or other embedded computing device(s). The SW defined radio may utilize processor(s) 112 and software defined or stored in memory 114. Alternatively, the radio 108 may be implemented at least in part using analog components.

The processing unit 110 may also include a clock 206 configured to maintain a time. The clock 206 may also be configured to provide one or more count-up or count-down timers. Such timers may be used in frequency hopping among multiple communication channels. The clock 206 may also be used to regulate times during which the node must wait to transmit (e.g., IFS and contention windows).

A frequency hopping module 208 may be configured to communicate with the baseband processor 204 and the clock 206. In one example, the frequency hopping module 208 is configured to obtain time information and/or set frequency-hopping timers in the clock 206. Such time information and/or timers will indicate to the frequency hopping module 208 when to "hop" or tune a different channel or frequency. Additionally, the frequency hopping module 208 may be configured to direct the SW defined radio or other component of the radio 108 to perform the actual frequency changes. Accordingly, the frequency hopping module 208 is able to repeatedly shift between agreed upon frequencies, at agreed upon times and communicate with another node(s) for agreed upon periods of time and in agreed upon protocols.

In some implementations (e.g., when the node is a utility meter), the memory 114 may also include a metrology module 210 configured to collect consumption data of one or more resources (e.g., electricity, water, natural gas, etc.), which may then be transmitted to one or more other nodes 102 for eventual propagation to the central office 104 or other destination.

As discussed above, the memory 114 also includes the MAC module 116. The MAC module 116 includes logic to implement the upstream protocol 118 and the downstream protocol 120 for handling communications directed upstream and downstream neighbor nodes, respectively. In the case of nodes that use the HAP as the upstream protocol, the MAC module 116 may handle communications according to priority information received from the root node. The priority information may identify one or more time slots, and specify which of the one-hop neighbors of the root node has communication priority relative to other one-hop neighbors of the root node during each time slot. As noted above, the one-hop neighbor of the root node that has priority or ownership of a time slot is authorized to use shorter inter-frame spacing (IFS) and/or shorter contention window than other one-hop neighbors of the root node. IFS settings 212 and contention window settings 214 may be stored in the memory 114 in one or more settings files or data stores, and may indicate the IFS and contention window settings that each node is authorized to use during each time slot. Thus, the IFS settings 212 and contention window settings 214 for each one-hop neighbor of the root node define the relative priority of the respective one-hop neighbor relative to other one-hop neighbors during each time slot.

Example Priority Information

FIGS. 3A-3C illustrate three different examples of priority information that may be used to implement an upstream HAP. In all three examples, the priority information defines one or more time slots, and specifies which one-hop neighbor of the root node has communication priority relative to other one-hop neighbors of the root node during each time slot.

FIG. 3A illustrates an example of priority information 300A, in which temporal availability ($T_0$-$T_M$) of a control channel is divided into M uniform time slots. M represents a future time which may be fixed (e.g., 1 hour, 1 day, one month, etc.) or may indefinite (i.e., apply the priority information in perpetuity until changed). In this example, the time slots are of uniform length and are evenly allocated among one-hop neighbor nodes of a root node. For instance, in the example of FIG. 1, node 102B is given priority during a first time slot (Slot 1), node 102C is given priority during a second time slot (Slot 2), node 102D is given priority during a third time slot (Slot 3), and so forth. In this way, each one-hop neighbor 102B-102D of root node 102A is given equal opportunity to communicate with the root node 102A on the control channel.

FIG. 3B illustrates another example of priority information 300B, in which temporal availability ($T_0$-$T_M$) of a control channel is again divided into M uniform time slots. However, in this example, instead of allocating the time slots evenly among the one-hop neighbor nodes of a root node, the time slots are allocated unevenly among the one-hop neighbor nodes of the root node. For instance, nodes having a greater number of child nodes may be allocated more time slots (or a higher percentage of time slots) than nodes with fewer child nodes. In that case, the slots may or may not be assigned to the one-hop neighbor nodes in proportion to the number of child nodes that each has. Referring back to FIG. 1, node 102B has two child nodes, node 102C has two child nodes, and node 102D has one child node. In the example of FIG. 3B, the times slots are assigned to one-hop neighbors of the root node in portion to the relative number of child nodes that each has. Accordingly, nodes 102B and 102C are given priority in two time slots for every one time slot allocated to node 102D. That is, node 102B is given priority in the first two time slots (Slots 1 and 2), node 102C is given priority in the next two time slots (Slots 3 and 4), node 102D is given priority in the next one time slot (Slot 5), and so forth. In other embodiments, uniform time slots may be assigned among one-hop neighbors of the root node based on one or more other characteristics (e.g., nodes that have historically received higher network traffic may be allocated more time slots, or a higher percentage of time slots, than nodes that have historically received relatively less network traffic, etc.).

FIG. 3C illustrates an example of priority information 300C, in which temporal availability ($T_0$-$T_M$) of a control channel is again divided into M time slots. However, in this example, the time slots are non-uniform. That is, the time slots are of different lengths. For example, the time slots may be created to have lengths proportional to relative characteristics of the one-hop neighbors of the root node (e.g., number of child nodes of the respective one-hop neighbors of the root node, relative traffic of the one-hop neighbors of the root node, etc.). In the example of FIG. 3C, node 102D is allocated the smallest time slots (Slots 3, etc.) because it has the fewest number of child nodes and also because it experiences the least amount of network traffic. Node 102B is allocated somewhat larger time slots (Slots 1, 5, etc.) than node 102D because it has more child nodes than node 102D, but smaller time slots than node 102C because node 102B receives less network traffic than node 102C. Node 102C is allocated the largest time slots (Slots 2, 6, etc.) in this example because node 102C has the most child nodes and, being situated centrally in the network, tends to receive more network traffic than nodes 102B and 102D. Also worth noting in this figure is the fact that not all time slots need specify a priority node. Some slots (e.g., Slot 4) may be configured such that all nodes have the same relative priority. In that case, the IFS and contention windows of the nodes may be set based on one or more conventional MAC protocols, may be set randomly, etc.

FIGS. 3A-3C are merely illustrative of the types of priority information that may be used to implement a HAP, and other types of priority information may additionally or alternatively be used.

Example Transmission Scenarios

Figure 4A:
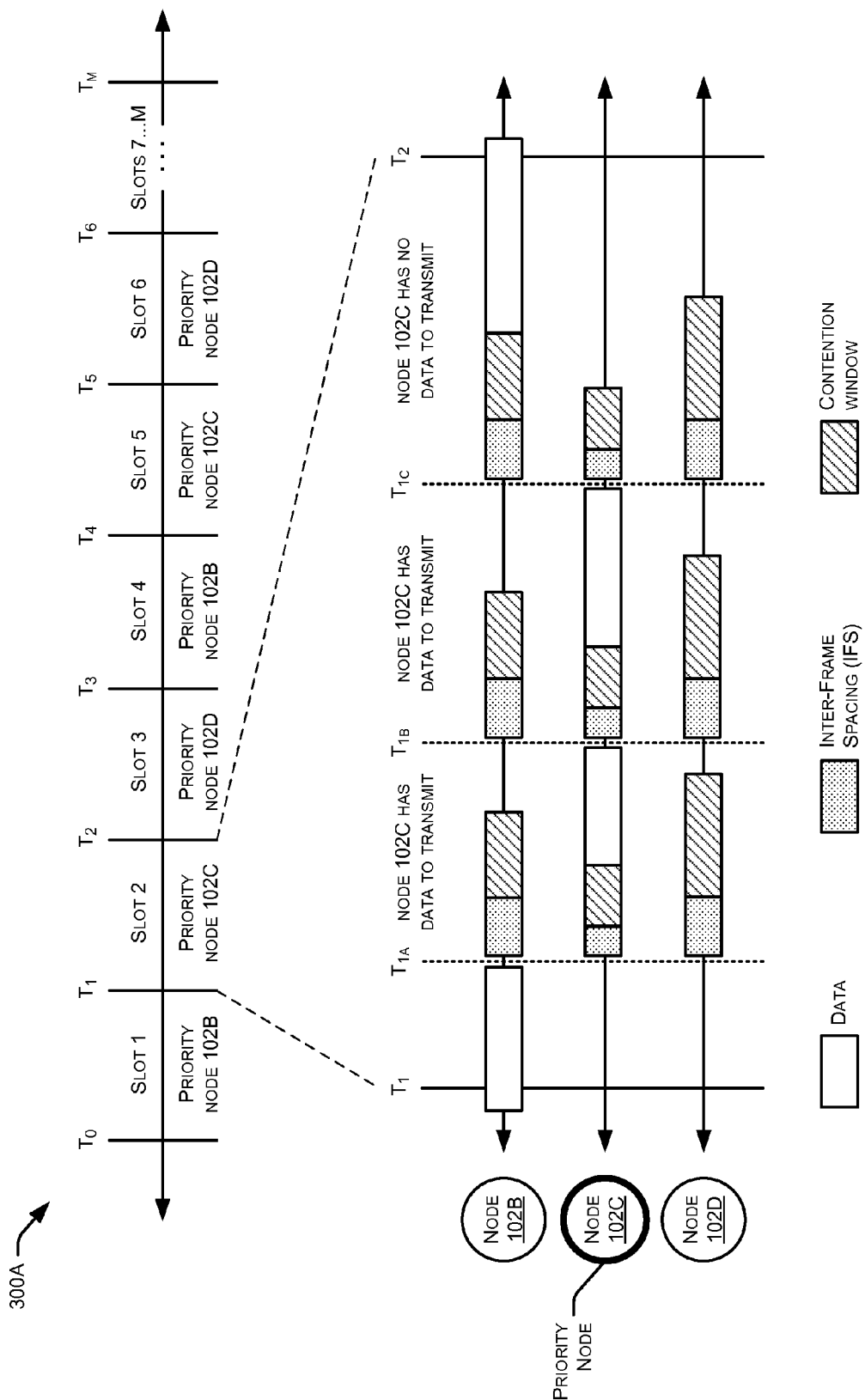
FIGS. 4A and 4B are schematic diagrams showing examples of how data may be transmitted during Slot 2 and Slot 3, respectively, defined in the priority information of FIG. 3A.
Figure 4B:
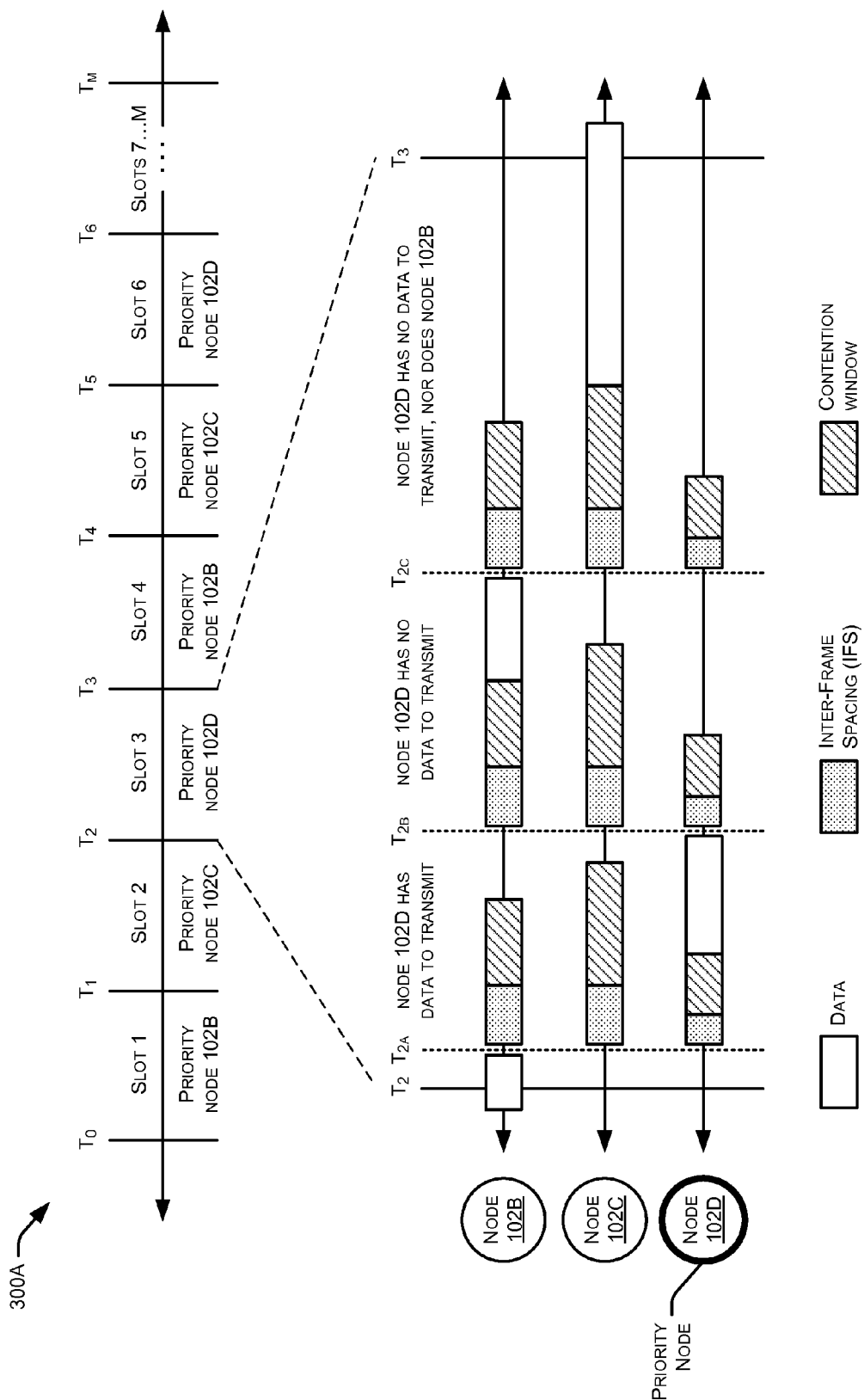

FIGS. 4A and 4B illustrate example data transmission scenarios during Slots 2 and 3, respectively, of the priority information 300A usable to handle communications according to the HAP. In FIGS. 4A and 4B, "Data," which may represent packets, frames, or other protocol data units (PDUs), are represented by solid white blocks, inter-frame spacings (IFSs) are represented by stippling, and contention windows are represented by hatching.

FIG. 4A corresponds to time Slot 2, in which node 102C is the priority node, meaning that it has a shorter IFS and/or contention window, and is therefore able to access the control channel sooner than, the other one-hop neighbors of the root node. In this example, both the IFS and the contention window of the priority node are shorter than the other one-hop neighbors of the root node. However, in other examples, the IFS and the contention window of the priority node need not both be shorter than the other one-hop neighbors of the root node.

At time $T_1$ node 102B is in the process of transmitting a packet, frame, or other PDU. At time $T_{1A}$, node 102B completes transmission of data and nodes 102B, 102C, and 102D wait for the IFS period specified in their respective IFS settings (e.g., IFS settings 212). Upon conclusion of their respective IFS, each of nodes 102B, 102C, and 102D then waits for the period of their respective contention windows specified in their respective contention window settings (e.g., contention window settings 214). Because node 102C is the priority node in this slot, node 102C's IFS and contention window elapse first. Having data to transmit, node 102C begins transmitting its data on the control channel. The data may represent any sort of data that the node 102C desires to send to the root node, such as resource consumption data (e.g., water, electricity, or gas consumption data of one or more smart utility meters), tamper flags indicating potential tampering with one or more nodes, or the like.

At time $T_{1B}$, node 102C completes transmission of data and the process described at $T_{1A}$ repeats. That is, nodes 102B, 102C, and 102D wait for the IFS period specified in their respective IFS settings. Upon conclusion of their respective IFS, each of nodes 102B, 102C, and 102D then waits for the period of their respective contention windows. Because node 102C is still the priority node in this slot, node 102C's IFS and contention window elapse first. In the example of FIG. 4A, node 102C still has additional data to transmit, so node 102C begins transmitting its data on the control channel.

At time $T_{1C}$, node 102C completes transmission of data and nodes 102B, 102C, and 102D wait for the IFS period specified in their respective IFS settings. Upon conclusion of their respective IFS, each of nodes 102B, 102C, and 102D then waits for the period of their respective contention windows. Because node 102C is still the priority node in this slot, node 102C's IFS and contention window elapse first. However, at time $T_{1C}$, node 102C has no additional data to transmit, so the node having the next shortest IFS/contention window (node 102B in this example) has an opportunity to transmit even though it is not the priority node in this time slot.

FIG. 4B corresponds to time Slot 3, in which node 102D is the priority node, meaning that it has a shorter IFS and/or contention window, and is therefore able to access the control channel sooner than, the other one-hop neighbors of the root node. Again in this example, both the IFS and the contention window of the priority node are shorter than the other one-hop neighbors of the root node. However, in other examples, the IFS and the contention window of the priority node need not both be shorter than the other one-hop neighbors of the root node.

At time $T_2$ node 102B is in the process of transmitting a packet, frame, or other PDU. At time $T_{2A}$, node 102B completes transmission of data and nodes 102B, 102C, and 102D wait for the IFS period specified in their respective IFS settings. Upon conclusion of their respective IFS, each of nodes 102B, 102C, and 102D then waits for the period of their respective contention windows specified in their respective contention window settings. Because node 102D is the priority node in this slot, node 102D's IFS and contention window elapse first. Having data to transmit, node 102D begins transmitting its data on the control channel.

At time $T_{2B}$, node 102D completes transmission of data and the process described at $T_{2A}$ repeats. That is, nodes 102B, 102C, and 102D wait for the IFS period specified in their respective IFS settings. Upon conclusion of their respective IFS, each of nodes 102B, 102C, and 102D then waits for the period of their respective contention windows. Because node 102D is still the priority node in this slot, node 102D's IFS and contention window elapse first. However, at time $T_{2B}$, node 102D has no additional data to transmit, so the node having the next shortest IFS/contention window (node 102B in this example) has an opportunity to transmit even though it is not the priority node in this time slot. Having data to transmit, at time $T_{2B}$, node 102B begins transmitting its data on the control channel.

At time $T_{1C}$, node 102B completes transmission of data and nodes 102B, 102C, and 102D wait for the IFS period specified in their respective IFS settings. Upon conclusion of their respective IFS, each of nodes 102B, 102C, and 102D then waits for the period of their respective contention windows. Because node 102D is still the priority node in this slot, node 102D's IFS and contention window elapse first. However, at time $T_{1C}$, node 102C has no additional data to transmit, so the node having the next shortest IFS/contention window (node 102B in this example) has an opportunity to transmit. However, in this example, node 102B also has no data to transmit, so the node having the next shortest IFS/contention window (node 102C in this example) has an opportunity to transmit. Having data to transmit, at time $T_{2C}$ node 102C begins transmitting its data on the control channel.

FIGS. 4A and 4B illustrate two examples of how the HAP avoids the problem of bandwidth waste in classic TDMA protocols, in which a TDMA slot is strictly reserved for a unique node even if the node does not presently have anything to transmit.

Example Methods of Managing Transmission Using Hybrid Access Protocol

Figure 5:
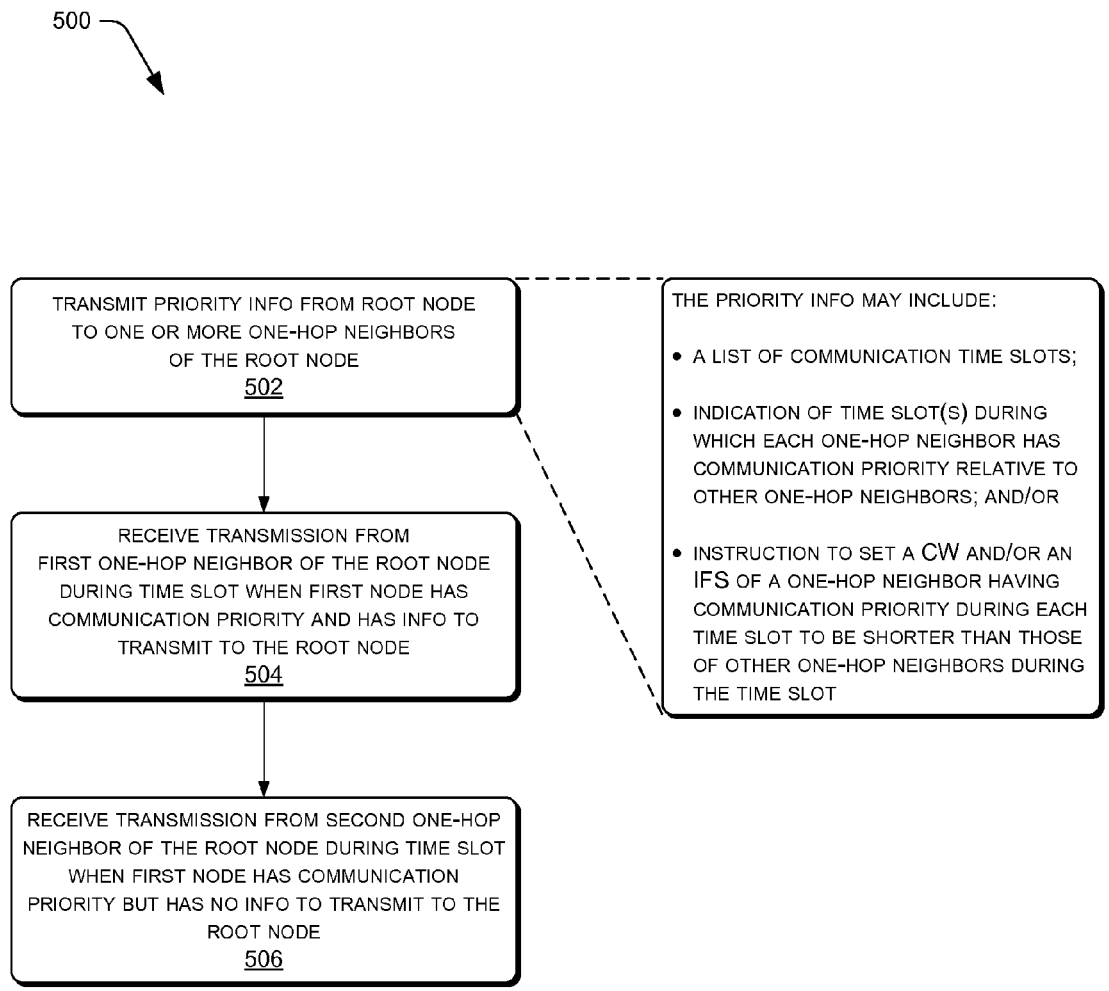
FIG. 5 is a flowchart illustrating an example method performed at least in part by a root node to implement a hybrid access protocol.
Figure 6:
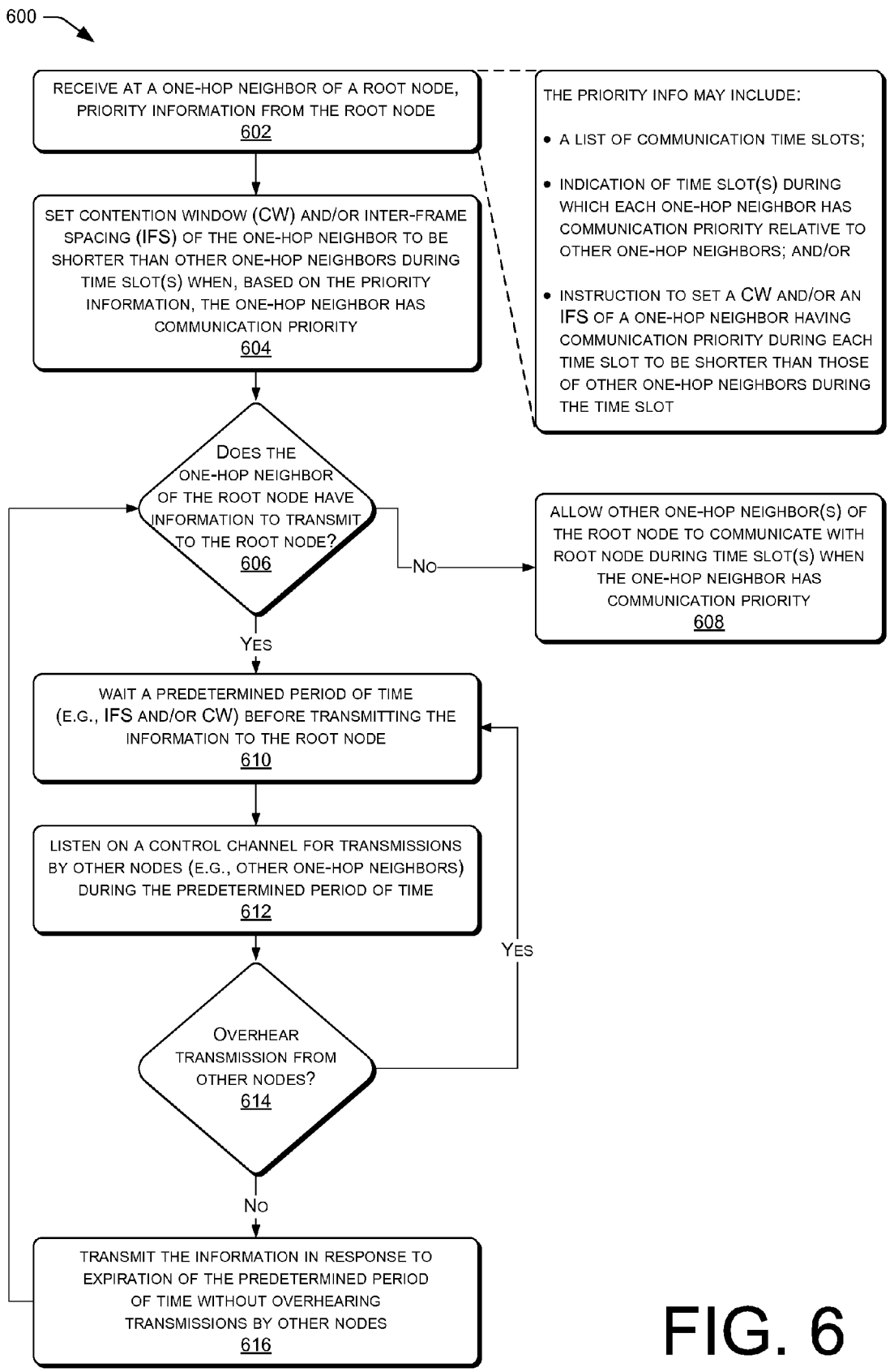
FIG. 6 is a flowchart illustrating an example method performed at least in part by a one-hop neighbor of a root node to implement a hybrid access protocol.

FIGS. 5 and 6 illustrate example methods that may be used to implement a hybrid access protocol. FIG. 5 is a flowchart generally illustrating operations performed by a root node, while FIG. 6 is a flow chart generally illustrating operations performed by a one-hop neighbor of the root node. The methods described with respect to FIGS. 5 and 6 may be implemented separately or in concert by different nodes of a network.

FIG. 5 illustrates an example method 500 performed at least in part by a root node of a mesh network. The method 500 is described with reference to the example architecture 100 of FIG. 1 for convenience. However, the method 500 is not limited to use with the example architecture 100 of FIG. 1 and may be implemented using other architectures and devices.

The method 500 begins at block 502, with a root node transmitting priority information to one or more one-hop neighbors of the root node. In the example of FIG. 1, the root node 102A may transmit the priority information to one-hop neighbor nodes 102B, 102C, and/or 102D. In the illustrated example, the priority information transmitted by the root node to the one-hop neighbors includes a list of communication time slots, and an indication of one or more of the communication time slots during which each one-hop neighbor of the root node has communication priority relative to other one-hop neighbors of the root node. For example, the root node may transmit priority information such as priority information 300A, 300B, or 300C, shown in FIG. 3, for example. In some implementations, the priority information may also include an instruction to the one-hop neighbor node to set a contention window and/or an IFS of the one-hop neighbors having communication priority during each communication time slot to be shorter than those of the other one-hop neighbors during the respective communication time slot. That is, the instruction may include data and/or executable code usable to instruct the one-hop neighbors to set their contention windows, IFS, or both to be shorter than the other one-hop neighbors during the time slots in which they are designated as having communication priority. In other implementations, the priority information may include additional or alternative data and/or may include different formats than those described above. For example, instead of a list of time slots, the priority information may include a table of time slots, a file of time slots, or may include priority information of a single time slot at a time (i.e., on an individual time slot by time slot basis).

As discussed above, and as shown in FIGS. 3A-3C, the priority information may define time slots that are all of a same or equal duration (e.g., as shown in FIGS. 3A and 3B), or some or all of the time slots may be of unequal durations (e.g., as shown in FIG. 3C). In the latter case, the list of communication time slots may include at least one communication time slot having a first duration and at least one time slot having a second duration, which is different than the first duration. Moreover, the time slots may be allocated equally amongst one-hop neighbors of the root node (e.g., as shown in FIG. 3A), or unequally (e.g., as shown in FIG. 3B). The example allocations of time slots shown in FIGS. 3A-3C are but three examples, and time slots may be allocated according to this disclosure in numerous other configurations.

After transmitting the priority information to one or more of its one-hop neighbors, the root node may, at block 504, receive a transmission from a first one-hop neighbor of the root node during a time slot when the first node has communication priority and has information to transmit to the root node. An example of this is shown at time $T_{2A}$ in FIG. 4B, when priority node 102D transmits data to the root node 102A during Slot 3, a slot in which node 102D has communication priority. Subsequently, at block 506, the root node may receive a transmission from a second one-hop neighbor of the root node during the time slot when the first node has communication priority but has no information to transmit to the root node. An example of this is shown at $T_{2B}$ in FIG. 4B, when node 102B is allowed to transmit data to the root node 102A during Slot 3, a slot in which node 102B does not have communication priority. Rather, in that example, the priority node, node 102D has no data to transmit at the time, so a node having a next shortest IFS and/or contention window and currently having data to transmit is given an opportunity to transmit during the time slot. In this way, time slots are not wasted by being dedicated to nodes that do not currently have data to transmit, as is the case in certain conventional MAC schemes, such as TDMA.

FIG. 6 illustrates an example method 600 of implementing a hybrid access protocol by a one-hop neighbor of a root node of a mesh network. For example, the method 600 may correspond to operations performed by a one-hop neighbor that receives the priority information transmitted by the root node at block 502 of FIG. 5. The method 600 is described with reference to the example architecture 100 of FIG. 1 for convenience. However, the method 600 is not limited to use with the example architecture 100 of FIG. 1 and may be implemented using other architectures and devices.

The method 600 begins at block 602, with a one-hop neighbor node (e.g., node 102B, 102C, or 102D) of a root node (e.g., node 102A) receiving priority information from the root node. The priority information may include a list of communication time slots, indication of one or more of the communication time slots during which the one-hop neighbor of the root node has communication priority relative to other one-hop neighbors of the root node, and/or an instruction to set a contention window and/or an IFS of the one-hop neighbor of the root node to be shorter than those of the other one-hop neighbors of the root node during the communication time slot(s) when the one-hop neighbor of the root node has communication priority. FIGS. 3A-3C illustrate three non-limiting examples of priority information that may be received by the one-hop neighbor node.

In various implementations, the communication time slots on the list of communication time slots may be of a same duration or of one or more different durations (e.g., at least one communication time slot having a first duration and at least one time slot having a second duration, which is different than the first duration). In some implementations, the priority information may allocate each one-hop neighbor of the root node an equal number of time slots during which the respective one-hop neighbor has priority relative to other one-hop neighbors of the root node. In other implementations, one or more one-hop neighbors of the root node may be allocated a greater number of time slots, during which the one or more one-hop neighbors have priority relative to other one-hop neighbors of the root node, than the other one-hop neighbors of the root node.

At block 604, based at least in part on the priority information received, the one-hop neighbor sets its contention window and/or IFS to be shorter than those of the other one-hop neighbors of the root node during the communication time slot(s) when the one-hop neighbor of the root node has communication priority.

At block 606, the one-hop neighbor determines whether it has information to transmit to the root node. If the one-hop neighbor does not currently have any data to transmit to the root node, at block 608, the one-hop neighbor allows one or more other one-hop neighbors of the root node (i.e., non-priority neighbors) to communicate with the root node during the time slot(s) even when the one-hop neighbor has communication priority. If, at block 606, the one-hop neighbor determines that it does have information to transmit to the root node, at block 610, the one-hop neighbor waits a predetermined period of time before transmitting the information to the root node. The predetermined period of time is based at least in part on the priority information received from the root node. For example, the one-hop neighbor may wait for its IFS setting (e.g., stored in IFS settings 212) and/or its contention window setting (e.g., stored in contention window settings 214).

While waiting the predetermined period of time, at block 612, the one-hop neighbor may listen on a control channel of the network for transmissions by other one-hop neighbors during the predetermined period of time. If, at block 614, the one-hop neighbor overhears a transmission from another node, the one-hop neighbor will wait until the transmission by the other node ends and will then return to block 610 to wait for its IFS and/or contention window to elapse.

If, at block 614, the one-hop neighbor does not overhear transmissions by any other nodes during the predetermined period of time, at block 616, the one-hop neighbor will transmit its information to the root node in response to expiration of the predetermined period of time without overhearing transmissions by other nodes, including other one-hop neighbors. Following transmission of the data, the method returns to block 606 to determine whether the one-hop neighbor has any additional information to transmit to the root node, at which point the method follows the same operations described above at block 606.

The methods 500 and 600 are illustrated as collections of blocks and/or arrows in logical flowcharts representing a sequence of operations that can be implemented in hardware, software, firmware, or a combination thereof. The order in which the blocks are described is not intended to be construed as a limitation, and any number of the described operations can be combined in any order to implement the method, or alternate methods. Additionally, individual operations may be omitted from the method without departing from the spirit and scope of the subject matter described herein. In the context of software, the blocks represent computer instructions that, when executed by one or more processors, perform the recited operations. In the context of hardware, the blocks may represent one or more circuits (e.g., application specific integrated circuits—ASICS) configured to execute the recited operations.

CONCLUSION

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
under control of a one-hop neighbor node of a root node of a network:
receiving priority information from the root node, the priority information including:
a list of communication time slots corresponding to a communication channel; and
indication of one or more of the communication time slots during which the one-hop neighbor of the root node has communication priority relative to one or more other one-hop neighbors of the root node;
setting at least one of a contention window or an interframe spacing of the one-hop neighbor of the root node based on the priority information received from the root node;

waiting a predetermined period of time before transmitting information to the root node, wherein waiting the predetermined period of time comprises waiting the at least one of the contention window or the inter-frame spacing;

listening on the communication channel for transmissions by other nodes during the predetermined period of time; and transmitting the information during an indicated time slot in response to expiration of the predetermined period of time without overhearing transmissions by other nodes during the predetermined period of time, wherein the one-hop neighbor of the root node is configured to allow the one or more other one-hop neighbors of the root node to communicate with the root node via the communication channel during the indicated time slot when the one-hop neighbor of the root node does not have information to transmit to the root node.

2. The method of claim 1, further comprising setting a contention window and/or an inter-frame spacing of the one-hop neighbor of the root node to be shorter than those of the one or more other one-hop neighbors of the root node during the indicated communication time slot.

3. The method of claim 1, wherein the communication time slots on the list of communication time slots are of a same duration.

4. The method of claim 1, wherein the communication time slots on the list of communication time slots include a first communication time slot having a first duration and a second communication time slot having a second duration, and wherein the second duration is different than the first duration.

5. The method of claim 1, wherein each one-hop neighbor of the root node has an equal number of time slots during which the respective one-hop neighbor has priority relative to other one-hop neighbors of the root node.

6. The method of claim 1, wherein the one-hop neighbor of the root node has a greater number of time slots, during which it has priority relative to other one-hop neighbors of the root node, than the other one-hop neighbors of the root node.

7. A network computing device of a communication network comprising:
one or more processors;
memory communicatively coupled to the one or more processors, the memory storing:
contention window settings and/or inter-frame spacing settings;
a list of communication time slots;
priority information, including an indication of one or more of the communication time slots during which the network computing device has communication priority relative to other one-hop neighbors of a root node; and
a media access control (MAC) module executable by the one or more processors to control transmission of communications between the network computing device and one or more other nodes of the communication network, the MAC module comprising a protocol defining how communications are to be transmitted from the network computing device to the root node of the communication network, wherein the MAC module is configured to adjust the contention window settings and/or the inter-frame spacing settings of the network computing device to be shorter than those of the other one-hop neighbors of the root node during the communication time slot(s) when the network computing device has communication priority.

8. The network computing device of claim 7, wherein the MAC module is further configured to:
determine that the network computing device does not have further information to transmit to the root node; and
allow one of the other one-hop neighbors of the root node to communicate with the root node during the time slot(s) when the network computing device has communication priority.

9. The network computing device of claim 7, further comprising:
a multi-channel radio capable of sending and receiving communications on multiple different channels; and
a frequency hopping module configured to switch between the multiple different channels in accordance with a predefined frequency hopping pattern of the multi-channel communication network.

10. The network computing device of claim 7, further comprising a metrology module stored in the memory and executable by the one or more processors to collect resource consumption data, the resource consumption data comprising electricity consumption data, water consumption data, and/or natural gas consumption data.

11. One or more computer-readable media storing instructions that, when executed by one or more processors of a root node of a communication network, configure the root node to perform acts comprising:
transmitting priority information from the root node to one or more one-hop neighbors of the root node, the priority information including:
a list of communication time slots;
indication of one or more of the communication time slots during which a one-hop neighbor of the root node has priority to communicate with the root node via a communication channel relative to one or more other one-hop neighbors of the root node; and
an instruction to set at least one of a contention window or an inter-frame spacing of the one-hop neighbor of the root node to be shorter than those of the one or more other one-hop neighbors of the root node during the indicated one or more communication time slots such that the one-hop neighbor is instructed to wait a predetermined period of time before transmitting information to the root node, wherein the predetermined period of time comprises the at least one of the contention window or the inter-frame spacing.

12. The one or more computer-readable media of claim 11, the acts further comprising:
receiving a transmission from a first one-hop neighbor of the root node via the communication channel during an indicated communication time slot; and
receiving a transmission from a second one-hop neighbor of the root node during the indicated communication time slot when the first one-hop neighbor has no information to transmit to the root node.

13. The one or more computer-readable media of claim 11, wherein the communication time slots on the list of communication time slots are of a same duration.

14. The one or more computer-readable media of claim 11, wherein the communication time slots on the list of communication time slots include a first communication time slot having a first duration and a second communication time slot having a second duration, and wherein the second duration is different than the first duration.

15. The method of claim 1, further comprising maintaining communication priority with respect to the communication channel throughout the indicated time slot regardless of whether one or more of the other one-hop neighbors of the root node have communicated with the root node via the communication channel during the indicated time slot.

16. The method of claim 1, further comprising transmitting information to the root node via the communication channel during the indicated time slot after one or more of the other one-hop neighbors of the root node have communicated with the root node via the communication channel during the indicated time slot.

17. The method of claim 1, wherein the communication channel comprises a control channel.

18. The one or more computer-readable media of claim 11, wherein the root node transmits priority information to a one-hop neighbor of the root node when the one-hop neighbor becomes associated with the root node.

19. The network computing device of claim 7, wherein the MAC module is further configured to cause the network computing device to wait a predetermined period of time before transmitting a communication to the root node, and wherein the predetermined period of time is based on the priority information.

20. The network computing device of claim 7, wherein:
  the protocol comprises an upstream protocol;
  the MAC module further comprises a downstream protocol, which is different than the upstream protocol, and which defines how communications are to be transmitted from the network computing device to downstream nodes of the communication network.

* * * * *